Feb. 18, 1964  H. H. MERRIMAN  3,121,577
INFLATABLE TUBE HOSE FITTING
Filed April 25, 1960  2 Sheets-Sheet 1
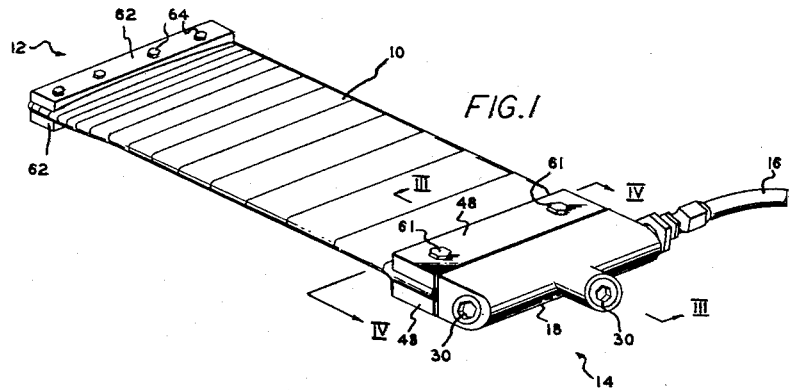
FIG.1
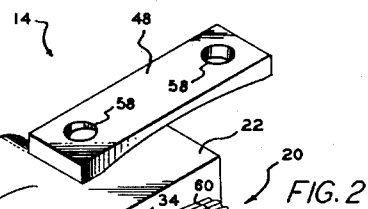
FIG.2
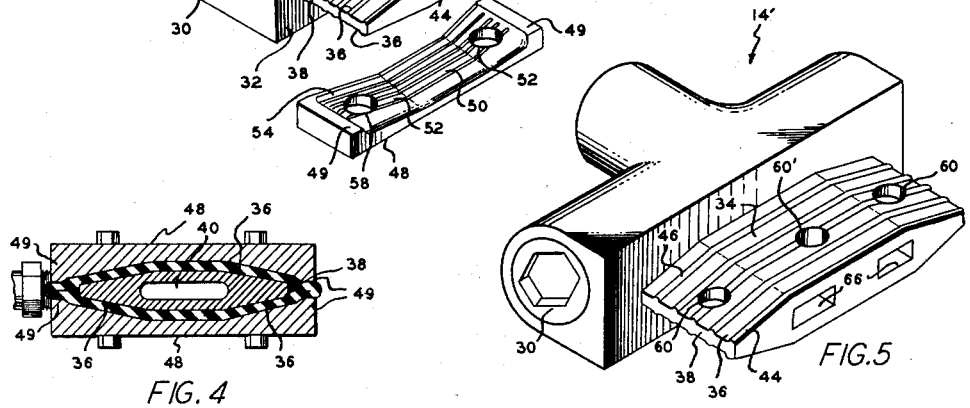
FIG.4
FIG.5
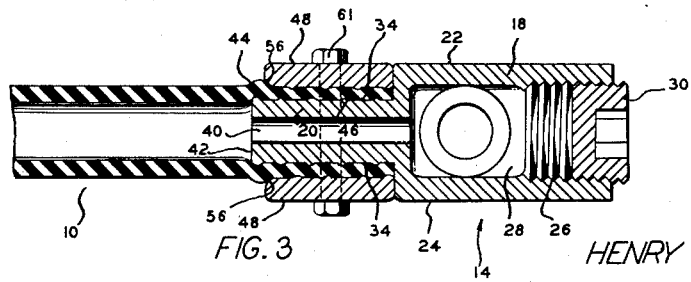
FIG.3
INVENTOR
HENRY H. MERRIMAN
BY Beaman & Beaman
ATTORNEY Feb. 18, 1964  H. H. MERRIMAN  3,121,577
INFLATABLE TUBE HOSE FITTING
Filed April 25, 1960  2 Sheets-Sheet 2
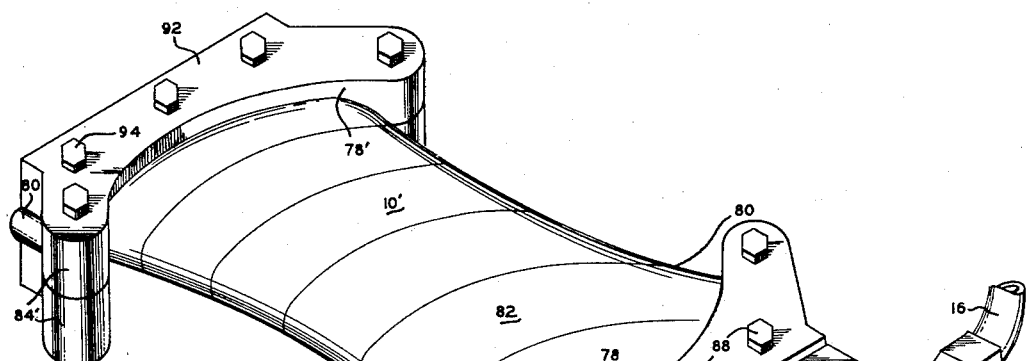
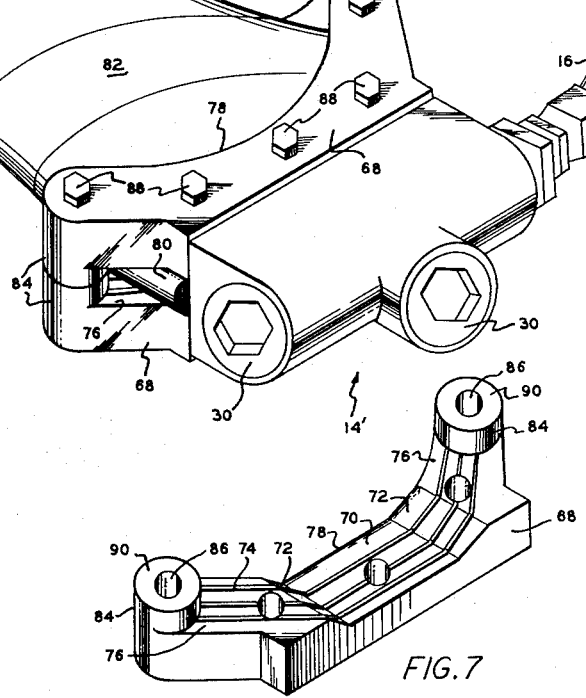
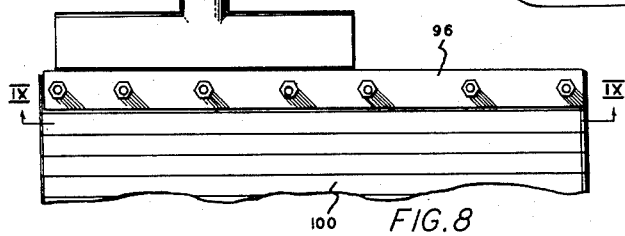
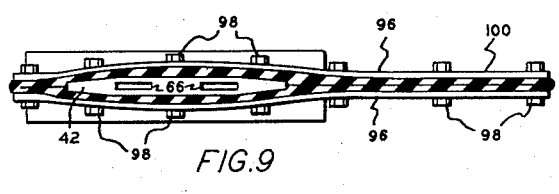
INVENTOR
HENRY H. MERRIMAN
BY Beaman Beaman
ATTORNEY

United States Patent Office 3,121,577
Patented Feb. 18, 1964

3,121,577
INFLATABLE TUBE HOSE FITTING
Henry H. Merriman, 751 W. Washington St.,
Jackson, Mich.
Filed Apr. 25, 1960, Ser. No. 24,500
4 Claims. (Cl. 285—150)

The invention relates to an inflatable tube hose fitting for use with flexible wall expandable motors and is a continuation in part of my U.S. applications No. 661,506 filed May 24, 1957 and now Patent No. 2,976,888 and No. 771,078, filed October 31, 1958 and now Patent No. 3,084,961.

A wide variety of applications for flexible wall radially expandable fluid motors have been discovered, wherein the fluid motor basically consists of a length of hose or like material which is of flattened configuration in the deflated state and assumes a substantially cylindrical configuration in an inflated state, the dimensional change of the hose between the deflated and inflated states being employed to produce a working stroke. Such motors may most economically be produced from a length of flexible hose-like material wherein a fitting is employed at each end of the hose to seal the same and means are provided in at least one of the fittings for introducing the pressurized medium into the hose interior. In that it is desirable that the hose assume a minimum dimensioned flattened state upon deflation, the fittings are formed to augment and maintain the flattened motor configuration.

It is thus an object of the invention to provide a fitting for an inflatable flexible wall motor which is of a flattened configuration and which has a hose engaging portion complementary to the hose flattened configuration.

A further object of the invention is to provide an end fitting for a radially expandable motor which effectively seals the end of the hose constituting the motor and which may be assembled to the hose by conventional tools.

Yet another object of the invention is to provide an end fitting for a radially expandable motor wherein the fitting components engaging the hose do not unduly stress the hose nor create weakened areas.

Another object of the invention is to provide an end fitting for radially expandable motors using a hose-like expansion chamber wherein the longitudinal tension forces created within the hose during inflation are substantially uniformly distributed throughout the hose circumference due to the end fitting configuration.

These and other objects of the invention arising from the structural arrangement and details of the embodiments thereof will be apparent from the following description and accompanying drawings wherein:

FIG. 1 is a perspective end view of an embodiment of a radially expandable motor and assembled fittings in accord with the invention, FIG. 2 is an exploded perspective view of the manifold end fitting employed in FIG. 1, FIG. 3 is an elevational sectional view of the assembled hose and fitting taken along section III—III of FIG. 1, FIG. 4 is an elevational sectional view taken along section IV—IV of FIG. 1, FIG. 5 is a perspective view of another embodiment of a manifold end fitting in accord with the invention, FIG. 6 is a perspective view of another embodiment of the invention wherein the hose clamping plates are constructed to uniformly distribute the longitudinal tension forces within the hose, FIG. 7 is a perspective view of one of the clamping plates of the embodiment of FIG. 6, FIG. 8 is a plan view of another embodiment of the invention showing a hose fitting in accord with the invention employed with a hose of very large diameter and FIG. 9 is an elevational sectional view of the embodiment of FIG. 8 taken along section IX—IX.

A complete radially expandable motor in accord with the invention is illustrated in FIG. 1 wherein the radially expandable chamber 10, preferably consists of a flexible hose-like member which is cut to the desired length. The ends of the chamber are sealed by an end sealing fitting 12 and a manifold fitting 14. The expandable chamber hose 10 is illustrated in the deflated or flattened form and it will be appreciated that the vertical dimension of the motor is small in relation to its length and width wherein the entire motor is of a generally planar configuration.

The pressurized medium is introduced into the bore or interior of the hose 10 by means of the manifold fitting 14. The pressurized medium may be either compressed air, oil or water under pressure which may be supplied through a supply hose 16 communicating with the fitting 14. Referring to FIG. 2, it will be appreciated that the manifold fitting 14 consists of a manifold portion 18 and a nipple portion 20 formed as an integral member of the manifold portion and extending therefrom. The manifold portion is of a flattened elongated configuration having upper and lower planar surfaces 22 and 24, respectively, and a plurality of inlet ports 26 are defined therein whereby the supply hose 16 may be affixed to the fitting in one of several positions, or a plurality of hoses may be affixed to a single fitting. The inlet ports 26 consist of threaded holes communicating with the inner chamber 28 of the manifold portion and those ports which are not being employed are plugged by a threaded plug 30.

Referring to FIG. 2 it will be noted that the nipple portion 20 extends from a planar surface 32 of the manifold portion 18, the manifold portion and nipple portion being formed of an integral casting in the preferred construction. The nipple portion is of a flattened configuration being of a width approximately equal to the width of the inner bore of the hose 10 when flattened. The nipple portion 20 consists of a central region of maximum thickness which is defined by a pair of spaced parallel opositely disposed surfaces 34. The lateral nipple portions extend from the central region and are defined by a pair of substantially planar converging surfaces 36 which terminate in an edge 38 defining the minimum nipple thickness. It will be observed that the central nipple region defines the maximum thickness of the nipple and a passageway 40 extends axially through this central region communicating with the manifold chamber 28 and opening into the hose interior through the inner nipple end surface 42. At the junction of the surfaces 34 and 36 and the inner nipple surface 42 a radiused lip 44 is formed which projects above the nipple surfaces 34 and 36 thereby preventing formation of a sharp edge which might harm the hose during the flexure thereof. The surfaces 34 and 36 are also preferably formed with a plurality of transversely extending ribs 46 which extend from the surface thereof to increase the frictional and sealing engagement of the hose upon the nipple portion.

The hose is maintained upon the fitting nipple portion 20 by means of a pair of oppositely disposed hose clamping plates 48, FIG. 2. The plates 48 are of a generally rectangular configuration having an inner hose engaging surface consisting of surfaces 50 and 52 which are complementally shaped to the surfaces 34 and 36 of the nipple portion, respectively, see FIG. 4. The hose engaging plates are also preferably provided with transversely extending ribs 54 and the inner hose engaging edges thereof are formed with a substantial radius 56 whereby the hose will not be subjected to an abrupt transition region between the clamped and unclamped portions, see FIG. 3, and thus, as the hose inflates and deflates, the radius 56 will not tend to cut into or unduly weaken the hose wall.

The hose engaging plates 48 and the nipple portion 20 are provided with holes 58 and 60 respectively, through which bolts 61 or similar fastening means may be inserted to draw the plates 48 toward the nipple portion. It will be noted that the hose engaging plates 48 are formed with an inwardly projecting boss 49 which compresses the folded hose edge and causes the hose to intimately engage the nipple edge 38 to obtain a tight sealing connection to the fitting.

As mentioned above, the other end of the hose expansion chamber 10 may be sealed by a pair of oppositely disposed hose clamping plates 62, FIG. 1, between which the hose is sandwiched and holes formed in the plates 62 receive bolts 64 to draw the plates toward each other to seal off the hose end. The clamping plates 62 are preferably formed with ribs, not shown, similar to ribs 54 of the hose engaging plates 48 and are also radiused as at 56 to protect the hose during flexing.

In assembling a motor as shown in FIG. 1, it is only necessary for the manufacturer to cut a flexible wall hose 10 of the desired length, such hose preferably being of the special construction which will assume a flattened configuration in the free form. The end fitting 14 is affixed to one end of the hose by inserting the nipple portion 20 into the hose until the end of the hose engages the nipple surface 32. Thereupon, holes may be formed in the hose walls, if they have not already been formed, to align with the nipple holes 60 and the clamping plates 48 are located on opposite sides of the hose and drawn toward each other upon the insertion and tightening of the bolts 61. The other end of the hose may be readily sealed by forming holes in the hose to receive the bolts 61 and locating the clamping plates 62 on opposite sides of the hose and drawing the plates toward each other by bolts 61 to hold the opposite walls of the hose in tight sealing engagement. The motor may now be used as desired upon the supply hose 16 being attached to an inlet port 26 and the unused ports plugged. It will be appreciated that both ends of the hose may be provided with a manifold fitting 14 if it is desired to introduce the pressurized medium into the hose quickly.

A variation in a manifold type fitting is shown in FIG. 5 wherein similar components to those of FIGS. 1 and 2 are indicated by like reference numerals. The modification of FIG. 5 is most commonly used with fittings of a larger size than those of the embodiment of FIGS. 1 and 2. In this embodiment two axially extending passageways 66 establish communication between the manifold chamber and the interior of the hose whereby a greater pressurized medium capacity is obtained. It will be noted that a third hole 60' is formed in this nipple configuration which extends through the central nipple region intermediate the passageways 66 and, likewise, the hose clamping plates employed with this embodiment will require a centrally located hole and bolt. In each of the above described embodiments the cross-sectional area of the passageways 40 or 66 is equal to the internal cross-sectional area of the supply hose supplying the pressurized medium whereby the nipple does not become a restriction in the pressurized medium circuit.

The embodiment of FIGS. 6 and 7 discloses a hose clamping plate configuration which aids in lengthening the life of the hose due to the possibility of fractures occurring in the hose from longitudinal tension stresses. In this embodiment the end fitting 14' is exactly the same as that disclosed in FIG. 5 and a supply hose 16 furnishes the pressurized medium to the fitting manifold. As shown in FIG. 7, the hose clamping plates 68 are provided with a central surface 70 and lateral surfaces 72 which are complementary to the nipple construction and transversely extending ribs 74 are formed thereon to increase the sealing characteristics. The outboard surfaces 76 are disposed parallel to the general plane of the plate. The improved result obtained by the hose clamping plates 68 arises from the fact that the inner edge 78 of the plates is arcuate in configuration whereby the axial length of the hose engaged by the hose clamping plates 68 is greater adjacent the hose folded edges 80 thereof than in the central hose region 82. The lateral terminal portions of the plates 68 are provided with bosses 84 and having holes 86 formed therein. A plurality of holes 86 are also formed in the hose clamping plates whereby bolts 88 may extend through the hole in the fitting nipple and hose clamping plates to draw the plates toward the nipple and compress the hose thereon. As will be apparent from FIG. 6, the bosses 84 are dimensioned whereby the edges 90 of opposed plates will approximately engage when the hose clamp plates are drawn down on the hose the desired degree to complete a connection to the fitting.

The hose end clamping plates 92 are formed similar to plates 68 except that the inner surfaces are formed on the same plane rather than being shaped complementary to the configuration of the nipple whereby upon the tightening of the bolts 94 the plates 92 will draw the opposite bore portions of the hose together into engagement to seal the end thereof. It will be noted that the boss portions 84 of the plates 68 and 92 are located whereby the folded edges 80 of the hose lie intermediate the bosses of a common plate and that the outer bolts of the plates will thereby insure that the hose is firmly clamped throughout its width.

The hose 10' illustrated in FIG. 6 is in a partially inflated condition and, as the hose inflates the increasing hose dimension in the central longitudinal region 82, and the fact that the hose adjacent the edges 80 begins to move inwardly, that the longitudinal stresses imposed upon the hose material will tend to become the greatest in the central region. To compensate for this uneven distribution of the longitudinal forces within the hose the arcuate clamping plate edges 78 and 78' decreases the longitudinal length of the unclamped hose adjacent the edges 80 with relation to the unclamped central hose region 82 whereby upon inflation of the hose and the production of longitudinal tension forces in the hose the unequal length of the unclamped hose produced by the configuration of the hose clamping plates will tend to uniformly distribute the tension forces throughout the circumference of the clamped hose. Theoretically, to produce the optimum distribution of the tension forces, the curve of the edge 78 should be an arc of a circle having a radius equal to the radius of the hose in the fully inflated condition assuming the hose to assume a perfectly cylindrical configuration.

FIGS. 8 and 9 show the application of a manifold fitting such as shown in FIGS. 2 or 3 with a hose 100 of much greater width than the fitting itself. Such an embodiment may be used in those special instances wherein a motor of very large capacity and working stroke is required and it is not practical to construct a special end fitting therefor. In this embodiment the fitting 14 is located in the bore of the hose such that the end of the hose will abut the planar manifold surface 32 and a pair of elongated clamping plates 96 are located upon opposite sides of the hose as shown in FIG. 9. The clamping plates 96 may be formed of a piece of strip metal which will deform under the influence of the tightening bolts 98, which extend through holes formed in the plates and holes formed in the fitting nipple portion and the hose 100. Thus, upon tightening the bolts 98 the plates 96 will draw that portion of the hose adjacent the fitting nipple into sealing engagement with the nipple and draw those portions of the hose bore which are not in engagement with the nipple together, as shown in FIG. 9, to completely seal off the end of the hose. The hose engaging sides of the plates 96 may be formed with serrations and are preferably radiused at the inner edge in a manner similar to the radius 56 of the embodiments of FIGS. 1 and 2.

It is also within the scope of the invention to mount a pair of end fittings side by side in assembling fittings to a very large hose and employing an elongated hose clamping plate similar to that shown in FIGS. 8 and 9 to maintain the hose clamped upon the fitting nipple portion. In such an embodiment an increased capacity of the flow of the pressure medium into the hose is obtained without manufacturing a special end fitting of unusually large dimensions.

I claim:

1. An end fitting for use with an inflatable flexible hose including a hollow-chambered member constituting a manifold, at least one pressurized medium inlet port defined in said manifold, a nipple mounted on said manifold and extending therefrom for insertion in the bore of the hose, said nipple being of a flattened configuration having a central region of maximum thickness in the direction perpendicular to the flattened configuration of said nipple defined by a pair of spaced parallel planar surfaces and lateral regions defined by outwardly converging planar surfaces, a passageway axially extending through said nipple communicating with said manifold, opposed clamping plates disposed on opposite sides of said nipple and hose, each clamping plate having an inner terminating edge, hose engaging surfaces defined on said plates complementary to said planar central and lateral region nipple surfaces, fastening means extending through said lateral regions interconnecting said clamping plates drawing said plates toward said nipple to compress the hose thereon in a flattened form, said inner terminating edge of said clamping plates adjacent said hose being relieved in a direction parallel to the hose longitudinal length whereby the pressure exerted on the hose by said plates adjacent said inner edge is distributed over a substantial axial portion of the hose.

2. In an end fitting for use with an inflatable flexible hose as in claim 1 wherein an end surface is defined on said nipple, a radiused lip formed on said nipple at the junction of said planar nipple surfaces and said end surface, said lip projecting above said planar surfaces and disposed adjacent said clamping plates inner terminating edges.

3. In an end fitting for use with an inflatable flexible hose as in claim 1 wherein a plurality of inlet ports are defined in said manifold.

4. An end fitting for use with an inflatable flexible hose including a hollow-chambered member, a pressurized medium inlet port defined in said member, a nipple mounted on said member and extending therefrom for insertion in the bore of the hose, said nipple being of a flattened configuration having a central region of maximum thickness in the direction perpendicular to the flattened configuration of said nipple and lateral regions of decreasing thickness, a passageway axially extending through said nipple communicating with said manifold, opposed clamping plates disposed on opposite sides of said nipple and hose, said clamping plates extending transversely to the longitudinal axis of the hose and having a transversely disposed inner continuous edge of concave arcuate configuration extending the width of the hose whereby the axial hose length compressed by said plates increases adjacent the lateral folded hose edges formed by the compression of the hose by said plates, said inner edge concave arcuate configuration being related to the inflated diametrical dimensions of the hose such that upon inflation of the hose the longitudinal stresses produced in the nose are substantially uniformly distributed throughout the circumference of said hose.

References Cited in the file of this patent

UNITED STATES PATENTS

| 1,072,896 | Alber | Sept. 9, 1913 |
| 1,887,985 | Auker | Nov. 15, 1932 |
| 2,567,165 | Buskirk | Sept. 11, 1951 |
| 2,692,781 | Langille | Oct. 26, 1954 |
| 2,793,057 | McGugin | May 21, 1957 |
| 2,876,023 | Ford | Mar. 3, 1959 |
| 3,084,961 | Merriman | Apr. 9, 1963 |

FOREIGN PATENTS

| 128,533 | Switzerland | Nov. 1, 1928 |